United States Patent
Namioka

(10) Patent No.: US 11,040,889 B2
(45) Date of Patent: Jun. 22, 2021

(54) WASTE FLUID TREATMENT APPARATUS

(71) Applicant: DISCO CORPORATION, Tokyo (JP)

(72) Inventor: Shinichi Namioka, Tokyo (JP)

(73) Assignee: DISCO CORPORATION, Tokyo (JP)

(*) Notice: Subject to any disclaimer, the term of this patent is extended or adjusted under 35 U.S.C. 154(b) by 0 days.

(21) Appl. No.: 16/740,695

(22) Filed: Jan. 13, 2020

(65) Prior Publication Data

US 2020/0223713 A1   Jul. 16, 2020

(30) Foreign Application Priority Data

Jan. 15, 2019 (JP) .............................. JP2019-004271

(51) Int. Cl.
    *C02F 1/00*      (2006.01)
    *C02F 103/34*    (2006.01)

(52) U.S. Cl.
    CPC ........ *C02F 1/001* (2013.01); *C02F 2103/346* (2013.01); *C02F 2201/001* (2013.01); *C02F 2303/24* (2013.01)

(58) Field of Classification Search
    CPC ...... C02F 1/001; C02F 1/44; C02F 2103/346; C02F 2303/24; C02F 2201/001; H01L 21/68; Y02P 70/10; B01D 36/04
    USPC ....................................................... 210/797
    See application file for complete search history.

(56) References Cited

U.S. PATENT DOCUMENTS

| | | | | |
|---|---|---|---|---|
| 2,868,384 A | * | 1/1959 | Puddington | B01D 21/0039 210/521 |
| 3,743,260 A | * | 7/1973 | Alleman | B23K 7/10 266/49 |
| 4,056,477 A | * | 11/1977 | Ravitts | B01D 17/0211 210/522 |
| 5,503,747 A | * | 4/1996 | Vion | B01D 17/00 210/519 |
| 5,520,825 A | * | 5/1996 | Rice | B01D 17/0208 210/802 |
| 9,610,520 B2 | * | 4/2017 | Onstad | B01D 21/0051 |
| 2005/0072724 A1 | * | 4/2005 | Nakayama | B01D 61/145 210/280 |

FOREIGN PATENT DOCUMENTS

JP   2004322214 A   11/2004
JP   2012228634 A * 11/2012 ............. B01D 21/02

* cited by examiner

*Primary Examiner* — Nam X Nguyen
*Assistant Examiner* — Ekandra S. Miller-Cruz
(74) *Attorney, Agent, or Firm* — Greer, Burns & Crain, Ltd.

(57) ABSTRACT

A waste fluid treatment apparatus removing processing debris from a processing waste fluid discharged from a processing apparatus. The waste fluid treatment apparatus includes a fluid bath storing the processing waste fluid, an inflow port through which the processing waste fluid is introduced to the fluid bath, a collecting area having an inclined surface for depositing the processing debris at a predetermined portion of a bottom of the fluid bath in a concentrated manner, a vacuum pump discharging the processing debris deposited in the collecting area to an outside of the fluid bath, and an outflow port through which a processing waste fluid obtained by removing the processing debris is discharged.

3 Claims, 2 Drawing Sheets

WASTE FLUID TREATMENT APPARATUS

BACKGROUND OF THE INVENTION

Field of the Invention

The present invention relates to a waste fluid treatment apparatus performing treatment of a waste fluid discharged from a processing apparatus.

Description of the Related Art

A processing apparatus processing a workpiece such as a semiconductor wafer while supplying a processing fluid discharges a processing waste fluid containing processing debris. There is a waste fluid treatment apparatus which is connected with the processing apparatus, precipitates the processing debris in the discharged processing waste fluid, and reuses water obtained by filtering the processing waste fluid with a filter as a processing fluid (refer to Japanese Patent Laid-open No. 2004-322214, for example).

SUMMARY OF THE INVENTION

When a large amount of sediment deposited at a bottom of a fluid bath of the waste fluid treatment apparatus, however, there arises a problem that the processing debris is red back with the processing waste fluid that has been filtered with the filter to become clear water in the fluid bath.

Therefore, it is an object of the present invention to provide a waste fluid treatment apparatus performing treatment of a waste fluid discharged from a processing apparatus and preventing processing debris from mixing back with a processing waste fluid that has been filtered.

In accordance with an aspect of the present invention, there is provided a waste fluid treatment apparatus connected with a processing apparatus processing a workpiece held on a holding table with a processing tool while supplying a processing fluid, the waste fluid treatment apparatus removing processing debris from a processing waste fluid discharged from the processing apparatus. The waste fluid treatment apparatus includes a fluid bath storing the processing waste fluid and having an inflow port through which the processing waste fluid discharged from the processing apparatus is introduced and an outflow port through which a processing waste fluid obtained by removing the processing debris is discharged, a filter disposed in the fluid bath to filter the processing waste fluid, a collecting area formed in the fluid bath to have an inclined surface for depositing the processing debris at a predetermined portion of a bottom of the fluid bath in a concentrated manner, and discharging means discharging the processing debris deposited in the collecting area to an outside of the fluid bath. In this waste fluid treatment apparatus, continuous waste fluid treatment is enabled by the discharging means discharging the processing debris deposited in the collecting area.

According to the aspect of the present invention, the processing debris deposited in the collecting area is discharged and continuous waste fluid treatment is enabled. Therefore, the deposited processing debris is not mixed back with the processing waste fluid (clear water) that has been filtered in the fluid bath, so that the processing waste fluid that has been filtered can be reused as the processing fluid.

For example, in a cutting processing apparatus cutting electrodes formed on a workpiece with a cutting tool, processing debris is in the form of fine particles (approximately 10 to 20 μm in diameter). In the related art, therefore, if the processing debris is deposited at a bottom of a fluid bath of a waste fluid treatment apparatus, the processing debris flows upward from the bottom of the fluid bath due to a flow of a processing waste fluid in the fluid bath of the waste fluid treatment apparatus. In the waste fluid treatment apparatus according to the aspect of the present invention, however, a collecting area in a recessed shape having an inclined surface is provided at a bottom portion of the fluid bath, so that the processing debris is deposited in the collecting area in a concentrated manner and the deposited processing debris can be discharged by discharging means. Therefore, the deposited processing debris is suppressed from moving toward a filtered processing waste fluid (clear water) side.

The above and other objects, features and advantages of the present invention and the manner of realizing them will become more apparent, and the invention itself will best be understood from a study of the following description and appended claim with reference to the attached drawings showing a preferred embodiment of the invention.

DETAILED DESCRIPTION OF THE PREFERRED EMBODIMENT

Figure 1:
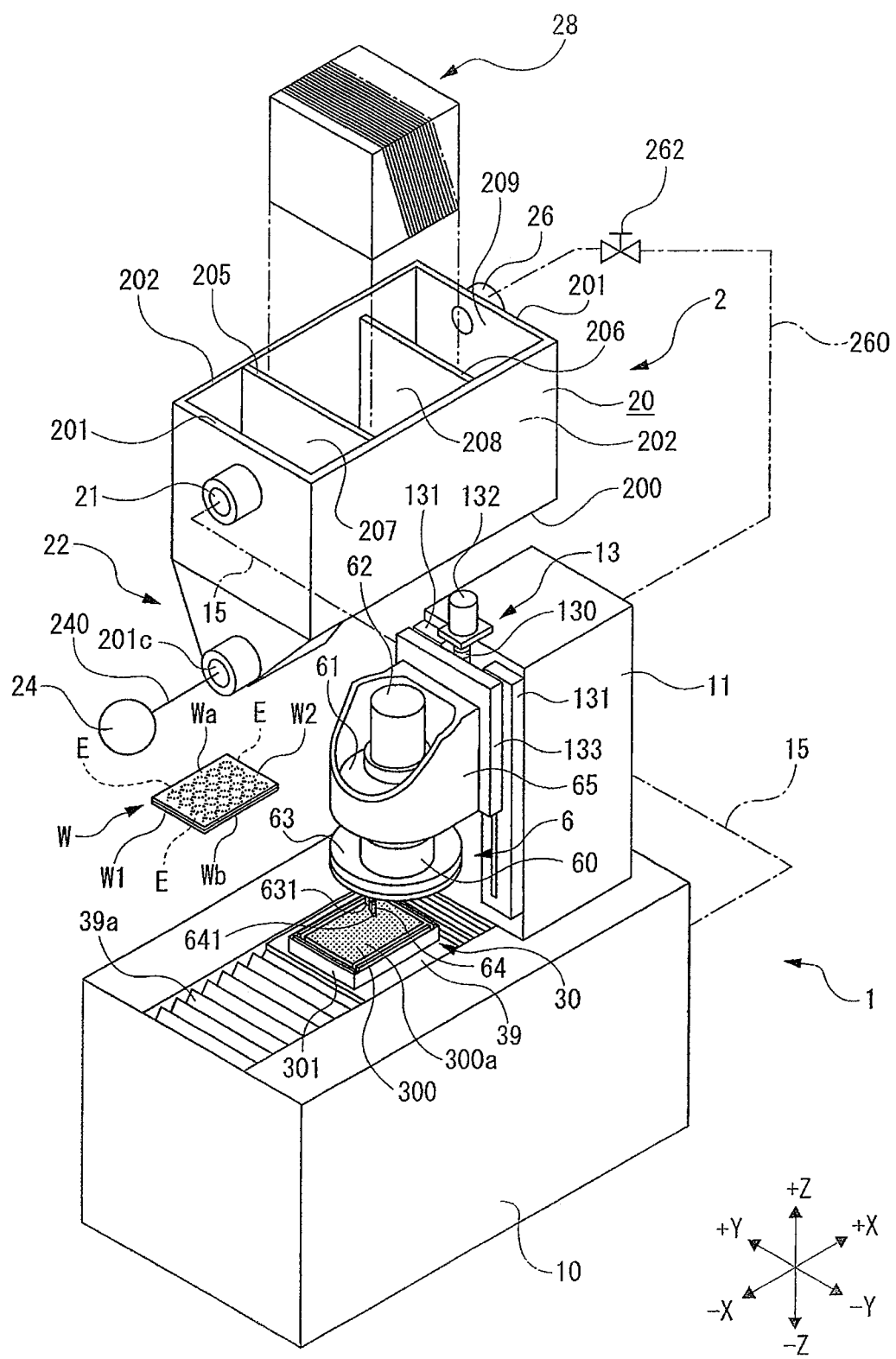
FIG. 1 is a perspective view illustrating an example of a processing apparatus and a waste fluid treatment apparatus connected to the processing apparatus.

A processing apparatus 1 illustrated in FIG. 1, to which a waste fluid treatment apparatus 2 according to an embodiment of the present invention is connected, is a tool cutting apparatus (a surface planer) in which a cutting unit 6 having a processing tool 64 that rotates about its axis extending in Z-axis directions performs tool-cutting on a workpiece W held on a holding table 30 to planarize an upper surface Wa as a cut surface of the workpiece W, for example. The processing apparatus 1 has two regions on a base 10 thereof: a front region (a region on a −X direction side) in which the workpiece W is placed on and taken out from the holding table 30; and a rear region (a region on a +X direction side) in which tool-cutting is performed on the workpiece W held on the holding table 30 by the cutting unit 6.

It is to be noted that the processing apparatus 1 may be a cutting apparatus which cuts and divides the workpiece W into individual chips with a rotating ring-shaped cutting blade, or may be a grinding apparatus which grinds and thins the workpiece W with rotating grinding stones.

The workpiece W has a rectangular outer shape in plan view and includes a substrate W1 of a predetermined thickness whose base material is silicon, for example. The substrate W1 has a functional layer stacked on an upper surface thereof with a plurality of devices (not illustrated) formed on the functional layer. The devices each have a plurality of protruding electrodes called bumps E mounted upright on an upper surface thereof. The bumps E are formed from copper as a main element into a columnar or spherical shape, for example. On the upper surface of the substrate W1, the devices are sealed together with the bumps E by a resin layer W2 formed of epoxy resin or the like. In other words, the workpiece W in the present embodiment is a so-called package substrate. An upper surface of the resin layer W2 serves as the upper surface Wa of the workpiece W to be cut, and a lower surface of the substrate W1 serves as a lower surface Wb of the workpiece W to be held on the holding table 30.

It is to be noted that the workpiece W is not limited to the example in the present embodiment and may be a disk-shaped silicon wafer, a substrate formed of a hard material such as a sapphire substrate and a silicon carbide substrate, a ceramic substrate, or the like.

The holding table 30 has a rectangular outer shape in plan view and includes an attracting portion 300 formed of a porous member or the like and attracting the workpiece W thereon, and a frame body 301 supporting the attracting portion 300. The attracting portion 300 of the holding table 30 is communicated with a suction source (not illustrated) such as an ejector mechanism or a vacuum generator, and a suction force generated by suction of the suction source is transmitted to a holding surface 300a which is an exposed surface of the attracting portion 300, so that the holding table 30 can hold the workpiece W under suction on the holding surface 300a. Further, while being surrounded by a cover 39, the holding table 30 can be reciprocated in the X-axis directions on the base 10 by a cutting-feed mechanism (not illustrated) disposed below the cover 39 and a bellows-like cover 39a which is connected to the cover 39 and expands and contracts in the X-axis directions.

It is to be noted that the holding table 30 is not limited to the example in the present embodiment and may be a holding table having a suction groove formed on a holding surface thereof or a pin chuck table having a plurality of supporting pins forming a holding surface.

A column 11 is mounted upright in a rear portion (+X direction side) on the base 10, and the column 11 has, on a front surface thereof, cutting-feed means 13 cutting-feeding the cutting unit 6 in the Z-axis directions (vertical directions) so as to separate from or approach the holding table 30. The cutting-feed means 13 includes a ball screw 130 whose axis extends in the Z-axis directions, a pair of guide rails 131 disposed in parallel with the ball screw 130, a motor 132 connected to an upper end of the ball screw 130 and driving the ball screw 130 to rotate, and an elevating plate 133 with an internal nut of which the ball screw 130 is threaded and whose side portions are slidably in connect with the guide rails 131. When the motor 132 drives the ball screw 130 to rotate, the elevating plate 133 is accordingly guided by the guide rails 131 to be reciprocated in the Z-axis directions, thereby cutting-feeding the cutting unit 6 fixed to the elevating plate 133 in the Z-axis directions.

The cutting unit 6 includes a spindle 60 whose axis extends in the Z-axis directions, a housing 61 supporting the spindle 60 in a rotatable manner, a motor 62 driving the spindle 60 to rotate, a disk-shaped cutting wheel 63 connected to a lower end of the spindle 60, a processing tool 64 detachably mounted to the cutting wheel 63, and a holder 65 holding the housing 61 and fixed to the elevating plate 133.

As illustrated in FIG. 1, a shank 631 of a substantially rectangular parallelepiped shape is attached to an outer peripheral region of a lower surface of the cutting wheel 63, for example, and the processing tool 64 (cutting tool 64) is fixed to a side surface of the shank 631 with a screw or the like. The processing tool 64 includes a cutting edge 641 formed in a sharply pointed shape at a lower end thereof, and the cutting edge 641 is formed by sintering diamond abrasive grains with a predetermined binder, for example.

In the tool-cutting performed by the processing tool 64 on the workpiece W, to a contact portion between the processing tool 64 and the workpiece W, a processing fluid (pure water, for example) is supplied from an external nozzle (not illustrated) disposed in the vicinity of the holding table 30. Alternatively, to the contact portion, a processing fluid (pure water, for example) is supplied from a supply port opened in the lower surface of the cutting wheel 63 through the spindle 60 of the cutting unit 6. The processing fluid becomes a processing waste fluid L (refer to FIG. 2) after being supplied to the contact portion.

There is a water case (not illustrated) disposed such that an opening thereof is positioned on both sides of a moving path of the holding table 30. The water case receives the processing waste fluid L (refer to FIG. 2), which contains processing debris mixed with bumps E-derived copper discharged as a result of tool-cutting of the workpiece W and flows down from the holding table 30, and delivers the processing waste fluid L to the waste fluid treatment apparatus 2 illustrated in FIGS. 1 and 2 via a pipe 15.

The processing apparatus 1 processes the workpiece W held on the holding table 30 with the processing tool 64 while supplying the processing fluid in this manner, and the waste fluid treatment apparatus 2 is connected with the processing apparatus 1 through the pipe 15 and removes processing debris B (refer to FIG. 2) from the processing waste fluid L discharged from the processing apparatus 1. The waste fluid treatment apparatus 2 includes a fluid bath 20 storing the processing waste fluid L, an inflow port 21 through which the processing waste fluid L is introduced into the fluid bath 20, a collecting area 22 having an inclined surface 200b for depositing the processing debris B at a predetermined portion of a bottom 200 of the fluid bath 20 in a concentrated manner, discharging means 24 discharging the processing debris B deposited in the collecting area 22 to an outside of the fluid bath 20, and an outflow port 26 through which a processing waste fluid L1 obtained by removing the processing debris B is discharged.

Figure 2:
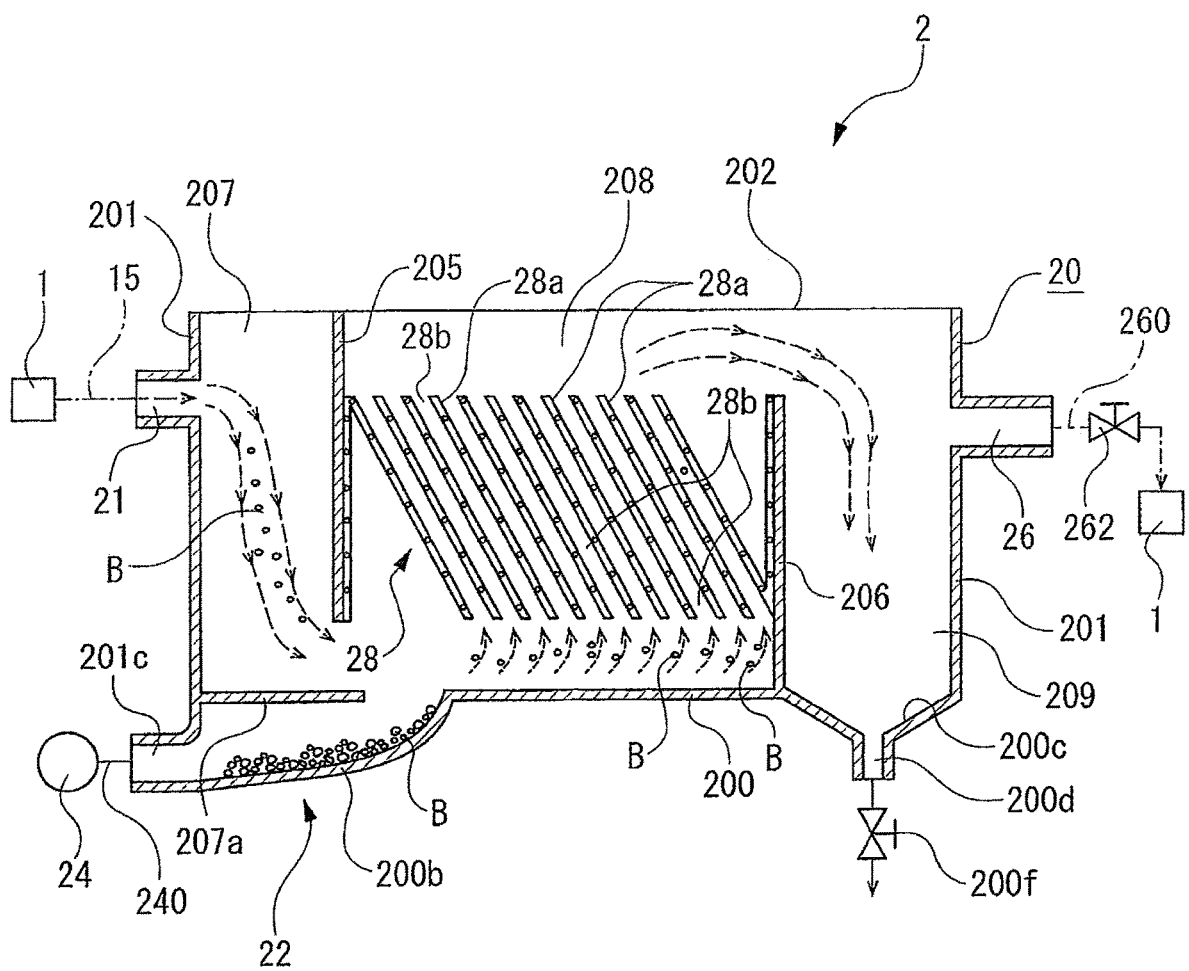
FIG. 2 is a sectional view illustrating a configuration example of the waste fluid treatment apparatus.

The fluid bath 20 is, in the example illustrated, a container of a substantially rectangular parallelepiped shape having an upper side thereof opened and includes the bottom 200 substantially rectangle in plan view and four side walls integrally standing from an outer periphery of the bottom 200 in the +Z direction. From among the four side walls, two side walls opposed to each other in the X-axis directions in FIGS. 1 and 2 are referred to as side walls 201, and the other two side walls opposed to each other in Y-axis directions are referred to as side walls 202. Further, at an upper portion of the fluid bath 20, there is provided an overflow pipe (not illustrated) for preventing the processing waste fluid L from overflowing. The overflow pipe is communicated with a tank (not illustrated) and guides the processing waste fluid L overflowing from the fluid bath 20 into the tank.

The fluid bath 20 has therein a waste fluid inflow section 207, a filter housing section 208, and a waste fluid outflow section 209 divided by partition walls 205 and 206 extending in vertical directions. As illustrated in FIG. 2, there is defined a predetermined gap (waste fluid passageway) between the partition wall 205 and the bottom 200. An upper end of the partition wall 206 is set lower than upper ends of the side walls 202 such that the processing waste fluid L1, which has moved upward in the filter housing section 208 and become clear water with the processing debris B removed, can climb over the partition wall 206 and flow into the waste fluid outflow section 209 without leaking from the fluid bath 20.

The inflow port 21 through which the processing waste fluid L is introduced into the fluid bath 20 is formed to extend through the side wall 201 on the −X direction side. For example, as illustrated in FIG. 2, there is disposed a guide plate 207a guiding a flow of the processing waste fluid L toward the filter housing section 208 side at a position below the inflow port 21 in the waste fluid inflow section 207.

The bottom 200 of the fluid bath 20 includes, for example, the inclined surface 200b inclined obliquely downward with respect to a horizontal direction from a position in the filter housing section 208 toward a position below the guide plate 207a in the waste fluid inflow section 207, and a space defined between the inclined surface 200b and the guide plate 207a mainly serves as the collecting area 22 having the inclined surface 200b for depositing the processing debris B in a concentrated manner. The inclined surface 200b may be inclined in a curved form as in the example illustrated in FIG. 2 or may be linearly inclined.

The guide plate 207a described earlier also plays a role of preventing the processing debris B deposited in the collecting area 22 from being stirred up by the flow of the processing waste fluid L entering from the inflow port 21. It is to be noted that, in a case where the waste fluid inflow section 207 has a volume large enough, the guide plate 207a need not be provided in the fluid bath 20.

At a lower portion of the side wall 201 on the −X direction side, a first processing debris discharging port 201c communicated with the collecting area 22 is formed to extend through the side wall 201, and the discharging means 24 including a vacuum pump or the like is communicated with the first processing debris discharging port 201c via a discharging pipe 240. It is to be noted that the discharging means 24 may be an opening/closing valve for controlling opening/closing of the discharging pipe 240. In this case, when the opening/closing valve is opened, the processing debris B is discharged through the discharging pipe 240 to the outside of the fluid bath 20 with a momentum of the processing debris B slipping down on the inclined surface 200b.

The filter housing section 208 includes a filter 28 accommodated therein whose outer shape is a rectangular parallelepiped and which is sized so as to be fitted in the filter housing section 208 with no gaps. As illustrated in FIG. 2, the filter 28 includes a plurality of inclined plates 28a formed of a resin, a filter paper, or the like inclined with a predetermined angle (approximately 30 degrees, for example) with respect to the partition walls 205 and 206 such that a filtering area is enlarged, and a plurality of narrow passageways 28b are formed between respective adjacent ones of the inclined plates 28a.

The bottom 200 in the waste fluid outflow section 209 is formed into, for example, a bottom 200c in a mortar shape inclined downward, and a second processing debris discharging port 200d is formed to extend through the mortar-shaped bottom 200c. The second processing debris discharging port 200d can be opened and closed by a first gate valve 200f and is communicated with a disposal box (not illustrated) for storing the processing debris.

At an upper portion of the side wall 201 on the +X direction side, the outflow port 26 through which the processing waste fluid L1 with the processing debris B removed is discharged is formed to extend through the side wall 201, and a supply pipe 260 is communicated with the outflow port 26. The processing waste fluid L1 having the processing debris B removed and discharged from the fluid bath 20 is sterilized through ion exchange or ultraviolet irradiation, for example, before it is reused as the processing fluid in the processing apparatus 1 illustrated in FIG. 1. The supply pipe 260 can be opened and closed by a second gate valve 262.

It is to be noted that the processing waste fluid L1 may be reused in any apparatuses other than the processing apparatus 1.

Described below are operations of the processing apparatus 1 and the waste fluid treatment apparatus 2 in the case where the workpiece W illustrated in FIG. 1 is tool-cut with the processing tool 64 while being supplied with the processing fluid, and the discharged processing waste fluid L containing the processing debris B illustrated in FIG. 2 is filtered to remove the processing debris B, thereby obtaining the processing waste fluid L1 (clear water L1).

First, the workpiece W is placed on the planar holding surface 300a with the resin layer W2 side facing upward such that a center of the holding table 30 illustrated in FIG. 1 is substantially aligned with a center of the workpiece W. Then, the suction force generated by operation of the suction source is transmitted to the holding surface 300a, so that the holding table 30 holds the workpiece W under suction on the holding surface 300a thereof.

The cutting unit 6 is fed in the −Z direction by the cutting-feed means 13 and positioned in height such that the cutting edge 641 which is a lowest end of the processing tool 64 cuts in the upper surface Wa of the workpiece W by a predetermined amount, that is, such that the cutting edge 641 cuts in the resin layer W2 and the bumps E by a predetermined amount. Further, the motor 62 drives the spindle 60 to rotate at a predetermined rotational speed, and the processing tool 64 accordingly rotates about the spindle 60 in an arcuate manner at a predetermined rotational speed.

While the holding table 30 holding the workpiece W under suction is successively fed in the +X direction at a predetermined cutting-feed speed, the rotating cutting edge 641 of the processing tool 64 successively cuts the resin layer W2 and the bumps E of the workpiece W to flatten the upper surface Wa of the workpiece W. The holding table 30 is moved in the +X direction to a predetermined position in the X-axis directions, and cutting is performed such that the entire upper surface Wa of the workpiece W is flattened by the rotating processing tool 64.

During cutting, the processing fluid (pure water, for example) is supplied to the contact portion between the processing tool 64 and the upper surface Wa of the workpiece W, thereby cooling and cleaning the contact portion. As a result, the workpiece W is cut and the processing debris B (refer to FIG. 2) in a fine-powder state containing copper or the like is generated, and the processing debris B is mixed into the processing fluid to generate the processing waste fluid L. The generated processing waste fluid L is received by the water case (not illustrated) and flows toward the waste fluid treatment apparatus 2 via the pipe 15.

The processing waste fluid L runs in the pipe 15 and flows into the waste fluid inflow section 207 of the fluid bath 20 through the inflow port 21 of the waste fluid treatment apparatus 2. After flowing down from the inflow port 21, the processing waste fluid L is received by the guide plate 207a illustrated in FIG. 2 and guided to the waste fluid passageway side between the partition wall 205 and the bottom 200, flowing into the filter housing section 208. In the meantime, part of the processing debris B contained in the processing waste fluid L falls on the inclined surface 200b of the bottom 200, slips down on the inclined surface 200b, and is deposited in the collecting area 22.

The processing waste fluid L having entered the filter housing section 208 moves upward through the narrow passageways 28b of the filter 28 and then flows into the waste fluid outflow section 209. At this time, the processing debris B contained in the processing waste fluid L does not move upward since it impinges against the inclined plates 28*a* of the filter 28. The processing debris B precipitates along the inclined plates 28*a* to be deposited at the bottom 200 in the filter housing section 208. Most of the processing debris B contained in the processing waste fluid L is thus deposited here. Therefore, the processing waste fluid that has passed through the filter 28 upward and climbed over the partition wall 206 to flow into the waste fluid outflow section 209 is the processing waste fluid L1 (clear water L1) with little processing debris B or with the processing debris B removed.

The processing waste fluid L1 having the processing debris B removed and having entered the waste fluid outflow section 209 flows down to the mortar-shaped bottom 200*c* in the waste fluid outflow section 209, and a small amount of fine processing debris contained in the processing waste fluid L1 precipitates to be collected to the second processing debris discharging port 200*d* at the mortar-shaped bottom 200*c*. In the meantime, when a fluid surface of the processing waste fluid L1 stored in the waste fluid outflow section 209 reaches a height of the outflow port 26, the processing waste fluid L1 discharged from the outflow port 26 flows into the supply pipe 260 opened by the second gate valve 262. The processing waste fluid L1 is then supplied to the processing apparatus 1 to be reused as the processing fluid.

When a predetermined amount of fine processing debris is deposited near the second processing debris discharging port 200*d* at the mortar-shaped bottom 200*c* in the waste fluid outflow section 209, the first gate valve 200*f* is opened to discharge the fine processing debris to the disposal box. It is to be noted that a mesh filter or the like may be disposed at the outflow port 26, for example, such that the mesh filter completely removes the small amount of fine processing debris contained in the processing waste fluid L1. Needless to say, if the filter 28 can filter the processing waste fluid L to remove the processing debris B to a necessary and sufficient degree, the mesh filter need not be provided.

After the processing debris B is deposited at the bottom 200 in the filter housing section 208, the processing debris B slips down on the inclined surface 200*b*, which is inclined obliquely downward toward the waste fluid inflow section 207 from the filter housing section 208, and is deposited in the collecting area 22 in a concentrated manner. Since the processing debris B deposited in the collecting area 22 is isolated from the flow of the processing waste fluid L in the fluid bath 20, the processing debris B does not return to the filter housing section 208.

In the present embodiment, with a predetermined amount of processing debris B deposited in the collecting area 22 or when a predetermined time period has passed since the waste fluid treatment apparatus 2 started operating, for example, the discharging means 24 including a vacuum pump or the like operates to suck the processing debris B and discharge the processing debris B deposited in the collecting area 22 to the outside of the fluid bath 20.

As described hereinabove, the waste fluid treatment apparatus 2 according to the embodiment of the present invention is connected with the processing apparatus 1 processing the workpiece W held on the holding table 30 with the processing tool 64 while supplying the processing fluid. The waste fluid treatment apparatus 2 includes the fluid bath 20 storing therein the processing waste fluid L, the inflow port 21 through which the processing waste fluid L is introduced into the fluid bath 20, the collecting area 22 having the inclined surface 200*b* for depositing the processing debris B at a predetermined portion of the bottom 200 in the fluid bath 20 in a concentrated manner, discharging means 24 discharging the processing debris B deposited in the collecting area 22 to the outside of the fluid bath 20, and the outflow port 26 through which the processing waste fluid L1 with the processing debris B removed is discharged. The processing debris B deposited in the collecting area 22 is therefore discharged, so that continuous waste fluid treatment is enabled. In addition, the deposited processing debris B is not mixed back with the processing waste fluid L1 (clear water L1) that has been filtered in the fluid bath 20, so that the processing waste fluid L1 that has been filtered can be reused as the processing fluid.

For example, in the processing apparatus 1 cutting the bumps E formed on the workpiece W with the processing tool 64 as in the present embodiment, the processing debris B is in the form of fine particles (approximately 10 to 20 μm in diameter). In the related art, therefore, if the processing debris B is deposited at the bottom 200 of the fluid bath 20 of the waste fluid treatment apparatus 2, the processing debris B flows upward from the bottom 200 of the fluid bath 20 due to the flow of the processing waste fluid L in the fluid bath 20 of the waste fluid treatment apparatus 2. In the waste fluid treatment apparatus 2 according to the embodiment of the present invention, however, the collecting area 22 in a recessed shape having the inclined surface 200*b* is provided at a bottom portion of the fluid bath 20, so that the processing debris B is deposited in the collecting area 22 in a concentrated manner and the deposited processing debris B can be periodically discharged by the discharging means 24. Therefore, the deposited processing debris B is suppressed from moving toward the processing waste fluid L1 (clear water L1) side.

The waste fluid treatment apparatus 2 according to the present invention is not limited to that in the above-described embodiment and, needless to say, may be implemented in various different forms within the scope of the technical idea of the present invention. Similarly, outer shapes or the like of the individual components of the processing apparatus 1 and the waste fluid treatment apparatus 2 illustrated in the accompanied drawings are not limitative and may be suitably modified within the scope within which the advantageous effects of the present invention are exhibited.

The present invention is not limited to the details of the above described preferred embodiment. The scope of the invention is defined by the appended claim and all changes and modifications as fall within the equivalence of the scope of the claim are therefore to be embraced by the invention.

What is claimed is:

1. A waste fluid treatment apparatus configured to be connected, by an inflow pipe and a supply pipe, with a processing apparatus processing a workpiece held on a holding table with a processing tool while supplying a processing fluid, the waste fluid treatment apparatus being configured to remove processing debris from a processing waste fluid discharged from the processing apparatus through the inflow pipe and supply clear fluid through the supply pipe to the processing apparatus and comprising:

a fluid bath storing the processing waste fluid and having an inflow port through which the processing waste fluid discharged from the processing apparatus through the inflow pipe is introduced and an outflow port through which clear fluid obtained by removing the processing debris is discharged to the supply pipe;

a filter disposed in the fluid bath and having a lower end extending close to a bottom of the fluid bath to filter the processing waste fluid;

a first partition wall provided between the inflow port and the filter, and having a lower end extending at least as close to the bottom of the fluid bath as the lower end of the filter to define a first passageway between the lower end of the first partition wall and the bottom of the fluid bath, so that the processing waste fluid passes through the first passageway at the bottom of the fluid bath and flows upwards through the filter;

a collecting area formed in the fluid bath to have an inclined surface for depositing the processing debris at a predetermined portion of the bottom of the fluid bath in a concentrated manner;

a guide plate provided between the lower end of the first partition wall and the bottom of the fluid bath, and configured to guide the processing waste fluid through the first passageway and to prevent the processing debris in the collecting area from being stirred by a flow of the processing waste fluid;

first discharging means discharging the processing debris deposited in the collecting area to an outside of the fluid bath; and a second partition wall provided between the filter and the outflow port, the second partition wall having an upper end extending lower than an upper end of side walls of the fluid bath to define a second passageway between the upper end of the second partition wall and a top of the fluid bath, so that the processing waste fluid passed through the filter flows into a waste fluid outflow section provided between the second partition wall and the outflow port and into an inlet of the outflow port located near the upper end of the side walls of the fluid bath, wherein continuous waste fluid treatment is enabled by the first discharging means discharging the processing debris deposited in the collecting area.

2. The waste fluid treatment apparatus as defined in claim 1 wherein the guide plate is located over the collecting area to prevent the processing debris in the collecting area from being stirred up by the processing waste fluid entering through the inflow port.

3. The waste fluid treatment apparatus as defined in claim 1 further comprising, second discharging means discharging the processing debris deposited in the waste fluid outflow section to an outside of the fluid bath.

* * * * *